(12) United States Patent
Schnyder et al.

(10) Patent No.: US 7,162,953 B2
(45) Date of Patent: Jan. 16, 2007

(54) ROLL ARRANGEMENT

(75) Inventors: Eugen Schnyder, Waltenschwil (CH); Joachim Hinz, Kempen (DE); Dirk Cramer, Duisburg (DE)

(73) Assignee: Voith Paper Patent GmbH, Heidenheim (DE)

( * ) Notice: Subject to any disclaimer, the term of this patent is extended or adjusted under 35 U.S.C. 154(b) by 454 days.

(21) Appl. No.: 10/382,515

(22) Filed: Mar. 7, 2003

(65) Prior Publication Data
US 2003/0199376 A1 Oct. 23, 2003

(30) Foreign Application Priority Data
Mar. 8, 2002 (DE) ............... 102 10 357

(51) Int. Cl.
*B30B 3/04* (2006.01)
*D21G 1/02* (2006.01)

(52) U.S. Cl. ............ 100/155 R; 100/41; 100/47; 100/172; 492/7; 492/16

(58) Field of Classification Search ........... 100/155 R, 100/161, 162 R, 164, 163 R, 165, 168, 163 A, 100/169, 171, 172, 35, 41, 176, 327, 334, 100/4.7; 492/6, 7, 16, 20; 72/241.6; 162/358.3
See application file for complete search history.

(56) References Cited

U.S. PATENT DOCUMENTS 4,236,448 A * 12/1980 Wieland ............... 101/216
4,384,516 A * 5/1983 Pankoke ............... 100/154
4,903,517 A * 2/1990 Van Haag et al. ....... 72/245
4,936,207 A * 6/1990 Niskanen et al. ....... 100/47
5,076,891 A * 12/1991 Link et al. ............ 162/206
5,263,840 A * 11/1993 Heitmann et al. ....... 425/363
5,816,146 A * 10/1998 Wagner et al. ......... 100/327
6,213,009 B1 * 4/2001 Satman et al. ......... 100/38

FOREIGN PATENT DOCUMENTS

DE 19704146 8/1998
EP 0328502 8/1989

* cited by examiner

*Primary Examiner*—Lowell A. Larson
*Assistant Examiner*—Jimmy T. Nguyen
(74) *Attorney, Agent, or Firm*—Greenblum & Bernstein, P.L.C.

(57) ABSTRACT

Roll arrangement that includes a deflection controlled roll and a counter roll. The counter roll and the deflection controlled roll are arranged to form at least one nip. The deflection controlled roll includes a rotating roll jacket, a carrier axially passing through the roll jacket, and support elements arranged between the roll jacket and the carrier. A plurality of the support elements, located at a nip side of the deflection controlled roll, are structured and controllable so that at least some of the plurality of support elements assume a position retracted from the roll jacket during a start-up operation of the deflection controlled roll. The instant abstract is neither intended to define the invention disclosed in this specification nor intended to limit the scope of the invention in any way.

33 Claims, 1 Drawing Sheet

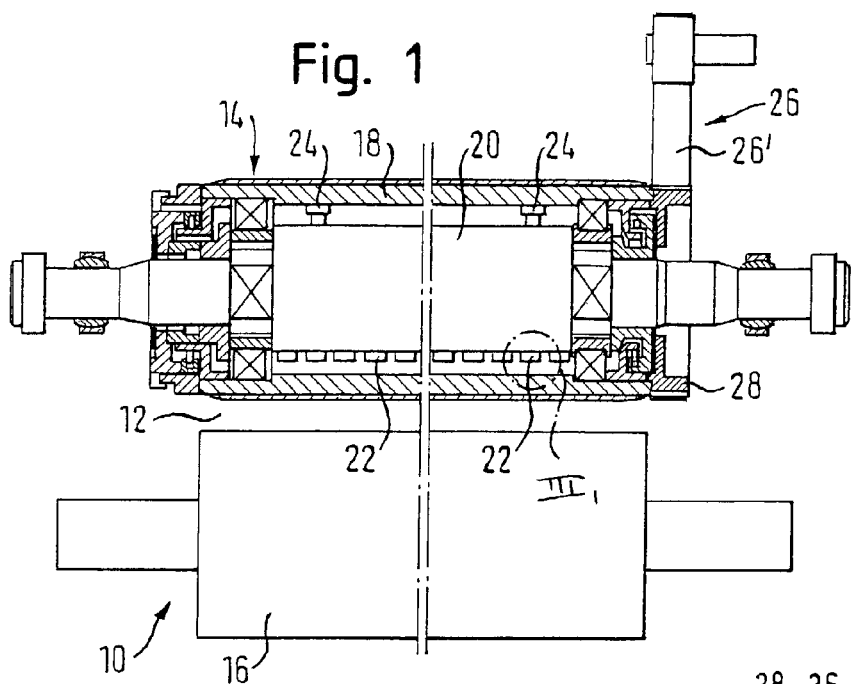
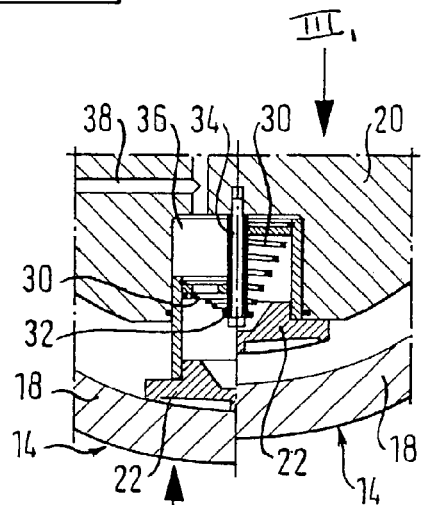
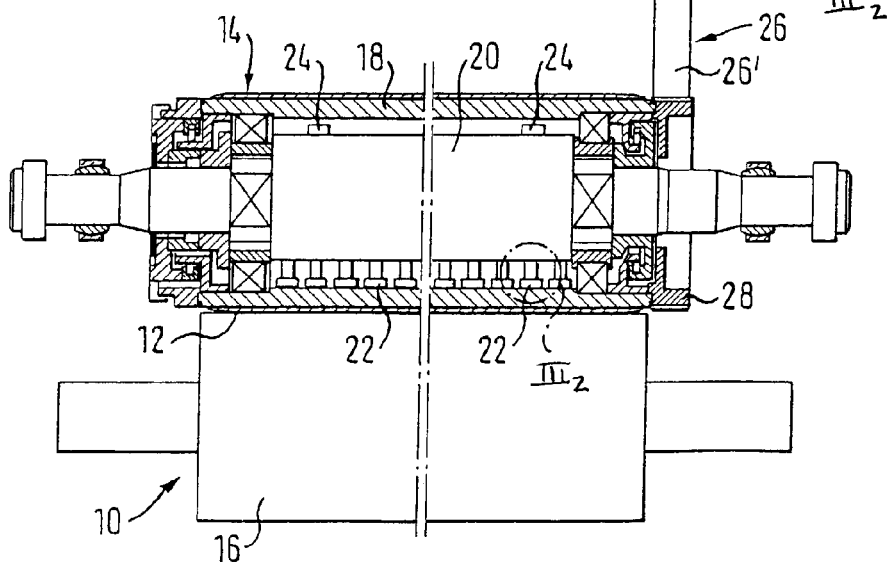

ROLL ARRANGEMENT

CROSS-REFERENCE TO RELATED APPLICATIONS

The present application claims priority under 35 U.S.C. §119 of German Patent Application No. 102 10 357.7, filed Mar. 8, 2002, the disclosure of which is expressly incorporated by reference herein in its entirety.

BACKGROUND OF THE INVENTION

1. Field of the Invention

The present invention relates to a roll arrangement having at least one nip which is formed between a deflection controlled roll, e.g., a self-adjusting deflection controlled roll, and a counter roll, with the deflection controlled roll including a rotating roll jacket, a rotationally fixed carrier passing axially through the roll jacket and support elements arranged between the roll jacket and the carrier. The invention also relates to the deflection controlled roll, e.g., the self-adjusting deflection controlled roll, for the roll arrangement. The deflection controlled roll includes a rotating roll jacket, a carrier axially passing through the roll jacket, and support elements arranged between the roll jacket and the carrier.

2. Discussion of Background Information

Deflection controlled rolls, e.g., self-adjusting deflection controlled rolls, are used, among other things, in multi-roll calenders in which gears are currently employed. However, vibration problems arise due to the gear toothing and, moreover, require a relatively large amount of space. In view of the present speeds, which are much higher than previously, the vibration problems occur to an increased degree. A higher roll weight also results due to the gears which have to be compensated by outwardly disposed support sources. Outwardly disposed support sources, however, just like the higher space requirements due, e.g., to the gears, bring about an enlargement of the bearing spacing measure. Finally, the gears are relatively expensive.

SUMMARY OF THE INVENTION

The present invention provides an improved roll arrangement as well as an improved deflection controlled roll of the type generally discussed above in which the noted deficiencies have been eliminated.

The instant invention is directed to a roll arrangement, in which support elements of the deflection controlled roll, located on a nip side, can be controlled so that at least some of these support elements adopt a position retracted from the roll jacket during a start-up operation of the deflection controlled roll, which takes place with an open nip.

Since, during start-up operation, in which the deflection controlled roll has to be correspondingly accelerated, at least some of the support elements at the nip side are retracted from the roll jacket, i.e., are no longer in active engagement with it, such that the drive power required on the starting of the deflection controlled roll is reduced so that the drive power in question can be applied, e.g., by a vibration damped auxiliary drive which only has to be designed for a correspondingly lower power. The friction and splash performance is, among other things, thus reduced as a consequence of the retracted support elements. The retracted support elements no longer represent any real obstacle for the circulating oil layer. In particular, oil can no longer splash against the support elements, whereby the roll jacket was previously strongly braked. After the closing of the nip has taken place, the additionally required power can be applied via the counter roll. Therefore, whole power does not have to be applied via the auxiliary drive.

A vibration damped auxiliary drive is, therefore, preferably associated at least with the deflection controlled roll. This can, e.g., only be a belt drive. Generally, however, other vibration damped drives can also be used.

The larger part, i.e., majority, of the support elements at the nip side advantageously adopt a position retracted from the roll jacket during start-up operation.

In a preferred practical embodiment of the roll arrangement in accordance with the invention, all support elements at the nip side adopt a position retracted from the roll jacket during start-up operation. In this manner, the drive power required during start-up is reduced to a minimum.

The support elements at the nip side, which are retracted during start-up operation of the roll jacket, can be expediently brought into contact with the roll jacket upon achieving the operating speed and/or upon the closing of the nip.

In a preferred practical embodiment of the roll arrangement in accordance with the invention, the support elements at the nip side in question are resiliently loaded into their retracted position. The support elements at the nip side in question are each preferably loaded into their retracted position by a conical spring. The conical spring expediently adopts the shape of a spiral, which is at least substantially flat, in the loaded state in order to achieve the highest possible compression and to retract the support element in question as far away as possible from the jacket.

In an expedient practical embodiment of the invention, the springs arranged to load the respective support elements at the nip side into the retracted position are positioned inside the support element and, preferably, are supported at an abutment which is arranged at an end of a bolt or the like which extends into the support element and is fixed to the carrier at its other end.

It is also in particular of advantage for the oil temperature to be controllable such that it is higher during start-up operation than thereafter.

In accordance with a further advantageous embodiment, the volume flow of the oil is changeable depending on whether the deflection controlled roll is in start-up operation or not.

The support elements at the nip side can in particular be brought into contact with the roll jacket by pressure loading. Therefore, the support elements can be hydraulic support elements and can be lubricated hydrodynamically and/or hydrostatically.

At least the support elements adopting their retracted position are expediently pressure free during start-up operation.

The roll arrangement can be designed, in particular, as a multi-roll calender, such that the invention is usable in such a multi-roll calender.

The instant invention relates to the deflection controlled roll in which the support elements are at least partly resiliently loaded into their position retracted from the roll jacket.

In a preferred practical embodiment of the deflection controlled roll in accordance with the invention, the support elements in question are each loaded into their retracted position by a conical spring. In the loaded state, this conical spring can adopt the shape of a spiral, which is at least substantially flat, in order to achieve the highest possible compression and, thus, to retract the support element as far as possible from the jacket.

In an advantageous expedient embodiment of the deflection controlled roll in accordance with the invention, the spring arranged to load a respective support element into the retracted position is located inside the support element and preferably is supported at an abutment which is arranged at one end of a bolt or the like which extends into the support element and which is fixed to the carrier at its other end.

The present invention is directed to a roll arrangement that includes a deflection controlled roll and a counter roll. The counter roll and the deflection controlled roll are arranged to form at least one nip. The deflection controlled roll includes a rotating roll jacket, a carrier axially passing through the roll jacket, and support elements arranged between the roll jacket and the carrier. A plurality of the support elements, located at a nip side of the deflection controlled roll, are structured and controllable so that at least some of the plurality of support elements assume a position retracted from the roll jacket during a start-up operation of the deflection controlled roll.

In accordance with a feature of the invention, the start-up operation occurs with an open nip.

Further, the deflection controlled roll can include a self-adjusting deflection controlled roll, and the carrier comprises a rotationally fixed carrier.

The roll arrangement can also include a vibration damped auxiliary drive associated with at least the deflection controlled roll. The vibration damped auxiliary drive may include be a belt drive.

A majority of the plurality of support elements at the nip side can assume a position retracted from the roll jacket during the start-up operation. Moreover, all of the plurality of support elements at the nip side can assume a position retracted from the roll jacket during the start-up operation.

The at least some support elements, which assume the retracted position from the roll jacket during the start-up operation, may be positionable to contact the roll jacket upon the deflection controlled roll reaching an operating speed. Further, the plurality of support elements, which assume the retracted position from the roll jacket during the start-up operation, are positionable to contact the roll jacket upon a closing of the nip.

According to the instant invention, the plurality of support elements may be structured and arranged to be resiliently loaded in the retracted position. Further, the roll arrangement can include conical springs, such that each of the plurality of support elements are structured and arranged to be loaded into the retracted positions by the conical springs. The conical springs can be formed to assume an at least substantially flat spiral shape in a loaded state.

The roll arrangement can further include a spring structured and arranged to load one of the plurality of support elements into the retracted position, wherein the spring is arranged inside the one support element. Moreover, a bolt can be fixed to the carrier and may be arranged to extend into the one support element. The bolt can have an abutment positioned on a free end of the bolt, such that the spring is supported at the abutment.

According to another feature of the invention, an oil temperature control device may be arranged to control an oil temperature in such a manner that the oil temperature during the start-up operation is higher than after the start-up operation.

Still further, an oil flow device can be arranged to change a volume flow of oil depending on whether or not the deflection controlled roll is in the start-up operation.

In accordance with still another feature of the invention, a pressure loading device may be arranged to move the plurality of support elements into contact with the roll jacket. The at least some support elements can be pressure free during the start-up operation. Further, the plurality of support elements may be pressure free during the start-up operation.

According to a further feature of the instant invention, the roll arrangement may be structured and arranged to form a multi-roll calender.

The present invention is directed to a deflection controlled roll that includes a rotating roll jacket, a carrier arranged to axially pass through the roll jacket, and support elements arranged between the roll jacket and the carrier. The support elements are least partly resiliently loaded into a position retracted from the roll jacket.

According to a feature of the instant invention, the deflection controlled roll can be structured and arranged to form a roll arrangement.

Further, the deflection controlled roll can be arranged as a self-adjusting deflection controlled roll.

The deflection controlled roll may also include conical springs arranged to load each of the support elements into the retracted position. The conical springs can be structured to assume an at least substantially flat spiral shape in a loaded state.

In accordance with a further feature, a spring can be structured and arranged to load one of the plurality of support elements into the retracted position, such that the spring is arranged inside the one support element. Further, a bolt can be fixed to the carrier and may be arranged to extend into the one support element. The bolt can have an abutment positioned on a free end of the bolt, such that the spring is supported at the abutment.

The present invention is directed to a process of operating a roll arrangement that includes a deflection controlled roll and a counter roll arranged to form at least one nip. The process includes positioning support elements of the deflection controlled roll arranged at a nip side of the deflection controlled roll in a position retracted from a roll jacket of the deflection controlled roll, and accelerating the deflection controlled roll to an operating speed.

According to a feature of the invention, the process can also include maintaining the nip in an open position during the accelerating of the deflection controlled roll to operating speed.

In accordance with another feature of the instant invention, the process can include closing the nip upon attaining operating speed of the deflection controlled roll.

Moreover, the process can include moving the support elements from the retracted position into contact with the roll jacket upon attaining operating speed of the deflection roll.

The process may also include moving the support elements from the retracted position into contact with the roll jacket, whereby the nip is closed.

In accordance with still yet another feature of the present invention, the process may further include driving at least the deflection controlled roll with a vibration damped auxiliary drive. Further, the vibration damped auxiliary drive can include a belt drive.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-examples of exemplary embodiments of the present invention, in which like reference numerals represent similar parts throughout the several views of the drawings, and wherein:

FIG. 1 schematically illustrates a partly sectioned view of a roll arrangement during which a deflection controlled roll is in start-up operation with an open nip arrangement;

FIG. 2 schematically illustrates the roll arrangement depicted in FIG. 1 with a closed nip arrangement; and FIG. 3 illustrates, in a right hand half, an enlarged representation of a region "III$_1$," of the deflection controlled roll depicted in FIG. 1 and, in a left hand half, an enlarged representation of a corresponding region "III$_2$" of the deflection controlled roll depicted in FIG. 2.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIGS. 1 to 3 show, in a purely schematic representation, an exemplary embodiment of a roll arrangement 10 comprising a nip or roll gap 12 which is formed between a deflection controlled roll 14 (e.g., a self-adjusting deflection controlled roll) and a counter roll 16.

The (self-adjusting) deflection controlled roll 14 includes a rotating roll jacket 18, a carrier 20 axially passing through roll jacket 18, support elements 22 at a nip side arranged between roll jacket 18 and carrier 20 as well as counter elements 24 provided at the other side of carrier 20.

As can be recognized with reference to FIGS. 1 and 2, deflection controlled roll 14 is driven via a vibration damped auxiliary drive, in the present case e.g. a belt drive 26, which can, for example, include a toothed belt 26' which cooperates with a toothed ring 28 provided at the roll jacket 18.

Support elements 22 at the nip side of deflection controlled roll 14 are controllable, in particular, via a corresponding control and/or regulation device, such that at least some support elements 22 adopt or assume a position retracted from roll jacket 18 (see FIG. 1 as well as the region "III$_1$" depicted in the right hand half of FIG. 3) during start-up operation of deflection controlled roll 14. In this regard, it is noted that the start-up operation occurs an open nip 12 in which deflection controlled roll 14 is accelerated. In the present case, all support elements 22 at the nip side adopt or assume a position retracted from jacket roll 18 during the start-up operation.

Moreover, as counter elements 24 contact roll jacket 18, roll jacket 18 is moved away from counter roll 16 relative to carrier 20, thereby opening nip 12. In the instant embodiment, overhead deflection controlled roll 14 is raised by counter elements 24 for opening of nip 12 and is supported in this upper position spaced apart from counter roll 16.

Support elements 22 at the nip side, which are retracted from roll jacket 18 during the start-up operation, are brought into contact with roll jacket 18 upon achieving or attaining operating speed and/or upon the closing of nip 12. For this purpose, support elements 22 at the nip side are correspondingly loaded with pressure. As can be seen, in particular, with reference to FIG. 3, hydrostatic support elements 22 are provided, which can be hydrodynamically and/or hydrostatically lubricated.

It can also be recognized with reference to FIG. 3 that support elements 22 on the nip side are each resiliently loaded into their retracted position. For this purpose, support elements 22 can each be loaded, in particular, by a conical spring. As is shown in the left hand half of FIG. 3, conical spring 30, in a loaded state, can be compressed into the shape of an at least substantially flat spiral in order to achieve the highest possible compression. Accordingly, the applicable support elements 22 can be retracted as far as possible from roll jacket 18.

Further, spring 30 is arranged inside applicable support element 22 and is supported, e.g. at an abutment 32 located at an end of a bolt 34 or the like that extends into support element 22 and that is fixed to carrier 20 at its other end (see FIG. 3). Conical spring 30 is pushed onto bolt 34 and is supported at its narrower or pointed end at abutment 32 and is supported at its opposite wider end, e.g. at the base of support element 22.

In accordance with FIG. 3, in the retracted position, the piston-like support element 22 largely lies within a cylinder space 36 formed in carrier 20. On a corresponding pressure loading, support element 22 is moved out, in a piston-like manner, against the spring force of spring 30 up to abutment at the inside of roll jacket 18. The corresponding pressure loading takes place via a lead or pressure fluid opening 38 opening into cylinder space 36. If support element 22 is switched to be pressure free, it is returned to the retracted position shown in the right hand half of FIG. 3 by conical spring 30.

Support elements 22 at the nip side are brought into contact with roll jacket 18 by loading a corresponding pressure against the force of spring 30, in contrast to the pressure free condition during the start-up operation, where support elements 22 are held in their retracted position by springs 30.

A corresponding roll arrangement can be provided, in particular, in a multi-roll calender.

In FIG. 1, deflection controlled roll 14 is in the start-up operation, which takes place with an open nip and in which deflection controlled roll 14 is accelerated accordingly. During start-up, support elements 22 at the nip side are pressure free, and, therefore, adopt or assume their retracted position (see the right hand part of FIG. 3) and are correspondingly held in this retracted position by conical springs 30. Upon achieving of operating speed and/or upon closing of nip 12, support elements 22 are loaded by pressure and, therefore, are moved against the force of springs 30 to be brought into contract with the inside of roll jacket 18 (see FIG. 2 as well as the left hand half of FIG. 3). As can be seen with reference to FIG. 2, counter elements 24 are retracted from roll jacket 18 subsequent to the start-up operation, i.e., after attaining operating speed and/or closing nip 12.

Alternatively or additionally, it is also conceivable to control or regulate oil temperature such that it is higher during the start-up operation than thereafter. It is also conceivable, e.g., to change a volume flow of the oil in dependence on or according to whether or not deflection controlled roll 14 is in the start-up operation.

A possible reduction in the drive power required on the starting of deflection controlled roll 14 is shown with reference to the following example:

With a deflection controlled roll having, e.g., a diameter of 1100 mm, a length of 10 m, having 48 support elements with a diameter of 150 mm each, and at a speed of 1800 m/min, a drive power of approximately 850 kW is required.

With a retraction of applicable support elements 22 at the nip side, a friction performance to be brought about between support elements 22 and roll jacket 18 of approximately 240 kW is omitted or avoided. Moreover, the splash performance (i.e., circulating oil in the roll splashing against the support elements) is reduced, e.g., by approximately 20% from, e.g., 580 kW to 460 kW such that the overall bearing friction remains below 500 kW.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERAL LIST

| | |
|---|---|
| 10 | roll arrangement |
| 12 | nip, roll gap |
| 14 | deflection controlled roll |
| 16 | counter roll |
| 18 | roll jacket |
| 20 | carrier |
| 22 | support element at the nip side |
| 24 | counter element |
| 26 | vibration damped auxiliary drive, belt drive |
| 26' | toothed belt |
| 28 | toothed ring |
| 30 | conical spring |
| 32 | abutment |
| 34 | bolt |
| 36 | cylinder space |
| 38 | lead |

What is claimed:

1. A roll arrangement comprising:
   a deflection controlled roll;
   a counter roll, said counter roll and said deflection controlled roll being arranged to form at least one nip;
   said deflection controlled roll comprising a rotating roll jacket, a carrier axially passing through said roll jacket, and support elements arranged between said roll jacket and said carrier; and
   a plurality of said support elements, located at a nip side of said deflection controlled roll, being structured and controllable so that at least one of said plurality of support elements assume a position retracted from said roll jacket during a start-up operation of said deflection controlled roll,
   wherein the start-up operation occurs with an open nip.

2. The roll arrangement in accordance with claim 1, wherein said deflection controlled roll being arranged as a self-adjusting deflection controlled roll, and said carrier comprises a rotationally fixed carrier.

3. The roll arrangement in accordance with claim 1, further comprising a vibration damped auxiliary drive associated with at least said deflection controlled roll.

4. The roll arrangement in accordance with claim 3, wherein said vibration damped auxiliary drive comprises a belt drive.

5. The roll arrangement in accordance with claim 1, wherein more than half of said plurality of support elements at said nip side assumes a position retracted from said roll jacket during the start-up operation.

6. The roll arrangement in accordance with claim 1, wherein all of said plurality of support elements at said nip side assume a position retracted from said roll jacket during the start-up operation.

7. The roll arrangement in accordance with claim 1, wherein said at least one of said plurality of support elements, which assume said retracted position from said roll jacket during the start-up operation, are positionable to contact said roll jacket upon said deflection controlled roll reaching an operating speed.

8. The roll arrangement in accordance with claim 1, wherein said plurality of support elements, which assume said retracted position from said roll jacket during the start-up operation, are positionable to contact said roll jacket upon a closing of said nip.

9. The roll arrangement in accordance with claim 1, wherein said plurality of support elements are structured and arranged to be resiliently loaded in said retracted position.

10. The roll arrangement in accordance with claim 9, further comprising conical springs, such that each of said plurality of support elements are structured and arranged to be loaded into said retracted positions by said conical springs.

11. The roll arrangement in accordance with claim 10, wherein said conical springs are formed to assume an at least substantially flat spiral shape in a loaded state.

12. The roll arrangement in accordance with claim 1, further comprising a spring structured and arranged to load one of said plurality of support elements into said retracted position, wherein said spring is arranged inside said one support element.

13. The roll arrangement in accordance with claim 12, further comprising a bolt that is fixed to said carrier and is arranged to extend into said one support element, said bolt comprising an abutment positioned on a free end of said bolt, wherein said spring is supported at said abutment.

14. The roll arrangement in accordance with claim 1, wherein an oil temperature is adapted to be controlled in such a manner that the oil temperature during the start-up operation is higher than after the start-up operation.

15. The roll arrangement in accordance with claim 1, wherein a volume flow of oil is adapted to change depending on whether or not said deflection controlled roll is in the start-up operation.

16. The roll arrangement in accordance with claim 1, wherein said plurality of support elements are adapted to be moveable by a pressure loading device so as to move into contact with said roll jacket.

17. The roll arrangement in accordance with claim 16, wherein said at least one of said plurality of support elements are pressure free during the start-up operation.

18. The roll arrangement in accordance with claim 16, wherein said plurality of support elements are pressure free during the start-up operation.

19. The roll arrangement in accordance with claim 1, structured and arranged to form a multi-roll calender.

20. A deflection controlled roll comprising:
a rotating roll jacket;
a carrier arranged to axially pass through said roll jacket;
support elements arranged between said roll jacket and said carrier,
wherein said support elements are least partly resiliently loaded into a position retracted from said roll jacket during a start-up operation of said roll jacket,
further comprising conical springs arranged to load each of said support elements into said retracted position,
wherein said conical springs are structured to assume an at least substantially flat spiral shape in a loaded state.

21. The deflection controlled roll in accordance with claim 20, structured and arranged to form a roll arrangement.

22. The deflection controlled roll in accordance with claim 20, said deflection controlled roll being arranged as a self-adjusting deflection controlled roll.

23. The deflection controlled roll in accordance with claim 20, further comprising a spring structured and arranged to load one of said plurality of support elements into said retracted position, wherein said spring is arranged inside said one support element.

24. The deflection controlled roll in accordance with claim 23, further comprising a bolt that is fixed to said carrier and is arranged to extend into said one support element, said bolt comprising an abutment positioned on a free end of said bolt, wherein said spring is supported at said abutment.

25. The deflection controlled roll in accordance with claim 20, further comprising springs structured and arranged to load each of said plurality of support elements into said retracted positions, wherein said springs are arranged inside each support element.

26. The deflection controlled roll in accordance with claim 25, further comprising bolts that are fixed to said carrier and are arranged to extend into each support element, said bolts comprising abutments positioned on tree ends of said bolts, wherein said springs are supported at said abutments.

27. A process of operating a roll arrangement that includes a deflection controlled roll and a counter roll arranged to form at least one nip, said process comprising:
positioning support elements of the deflection controlled roll arranged at a nip side of the deflection controlled roll in a position retracted from a roll jacket of the deflection controlled roll; and
accelerating the deflection controlled roll to an operating speed.

28. The process in accordance with claim 27, further comprising maintaining the nip in an open position during the accelerating of the deflection controlled roll to operating speed.

29. The process in accordance with claim 27, further comprising closing the nip upon attaining operating speed of the deflection controlled roll.

30. The process in accordance with claim 27, further comprising moving the support elements from the retracted position into contact with the roll jacket upon attaining operating speed of the deflection roll.

31. The process in accordance with claim 27, further comprising moving the support elements from the retracted position into contact with the roll jacket, whereby the nip is closed.

32. The process in accordance with claim 27, further comprising driving at least the deflection controlled roll with a vibration damped auxiliary drive.

33. The process in accordance with claim 32, wherein the vibration damped auxiliary drive comprises a belt drive.

* * * * *

UNITED STATES PATENT AND TRADEMARK OFFICE
CERTIFICATE OF CORRECTION

PATENT NO. : 7,162,953 B2 Page 1 of 1
APPLICATION NO. : 10/382515
DATED : January 16, 2007
INVENTOR(S) : Schnyder et al.

It is certified that error appears in the above-identified patent and that said Letters Patent is hereby corrected as shown below:

At column 10, line 4 (claim 26, line 4) of the printed patent, "on tree ends" should be ---on free ends--.

Signed and Sealed this

Thirteenth Day of May, 2008

JON W. DUDAS
*Director of the United States Patent and Trademark Office*